Patented Sept. 8, 1953

2,651,579

UNITED STATES PATENT OFFICE 2,651,579

HALOGENATED THIOPHENE PESTICIDE

Ralph E. Plump, Haddonfield, N. J., assignor to The Pennsylvania Salt Manufacturing Company, Philadelphia, Pa., a corporation of Pennsylvania No Drawing. Application August 12, 1946, Serial No. 690,085

17 Claims. (Cl. 99—225)

This invention relates to a new composition for control of insects and similar pests, particularly by fumigation, and to methods for control of such pests.

The art of fumigating, i. e. the art of killing insects and similar pests by subjecting them to the vapors of material toxic to them is well known. However, fumigants heretofore proposed have lacked the combination of physical and physiological properties desirable to make them completely acceptable as fumigants. For example, among these prior art materials the use of carbon disulfide is considered hazardous because of its extreme flammability, carbon tetrachloride is not sufficiently toxic to insects and similar pests, methyl bromide must be shipped and stored in pressure containers, and hydrocyanic acid is extremely toxic towards man.

I have now found that halogen-substituted thiophenes are particularly advantageous as insecticides, and particularly as fumigants in the control of insects and similar pests. "Halogen-substituted thiophenes," as used herein, comprises the products formed by the substitution of one or more atoms of chlorine, bromine or iodine for a like number of hydrogen atoms of the thiophene nucleus. The halogen-substituted thiophenes possess a combination of properties such as high toxicity to insects and relatively low toxicity to man, adequate volatility, and suitable prolonged period of activity to make them surprisingly effective for the fumigation of grain, flour, other food articles, clothing, fabrics, soil, the localities where these are handled and stored, and similar materials and localities where control of insects and similar pests is important.

Examples of suitable halogen-substituted thiophenes include the monochlorothiophenes, i. e.

 and 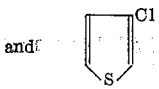

2-monochlorothiophene   3-monochlorothiophene and the various polychlorothiophene including 2,5-dichlorothiophene, 2,3-dichlorothiophene, 2,4-dichlorothiophene, 2,3,5-trichlorothiophene, 2,3,4-trichlorothiophene and 2,3,4,5-tetrachlorothiophene. Examples of other halogen-substituted thiophenes include the various bromine and iodine analogs of the above chloro compounds, e. g. 2-iodothiophene, 2-bromothiophene, and 2,5-dibromothiophene. Of these halogen-substituted thiophenes, the preferred insecticides are the 2-monochlorothiophene, the 2,5-dichlorothiophene, the 2,3,5-trichlorothiophene, and the tetrachlorothiophene.

I have further found that a particularly advantageous fumigant composition may be obtained when a halogen-substituted thiophene, as above described, is admixed with a more volatile vehicle. Carbon tetrachloride, which has itself been proposed as a grain fumigant but is of relatively low toxicity, is an unusually advantageous vehicle for certain halogen-substituted thiophenes. Other suitable vehicles include carbon disulfide, dichloroethane, dichloroethyl ether and thiophene. In the case of the higher boiling halogen-substituted thiophenes such as tetrachlorothiophene, it has been found particularly desirable in some applications to employ a volatile vehicle to aid in the vaporization and distribution of the chlorothiophene, whereas in other applications such as soil fumigation the slow vaporization of the undiluted material is an advantage.

The compositions of my invention may be used for the fumigation of flour mills, warehouses, grain elevators, atomospheric vaults, vacuum chambers and food storage localities generally, and in the fumigation of materials such as grain, flour, fruits, nuts, vegetables or other materials stored or handled therein, for the control of pests such as insects, worms and related pests (e. g. spiders and other pests of the same or related families and classes which it is generally desired to control along with insects and worms), in their adult, pupa, larva and egg stages. The compositions of my invention may also be used for the fumigation of soil, nurseries, greenhouses and similar localities for the control of various insect and worm pests and the like. Examples of insect and other pests which are advantageously controlled include flour beetles, bean weevils, moths, soil nematodes, spiders, etc.

In a preferred method of employing a fumigant of my invention, for example as grain fumigant, a halogen-substituted thiophene alone or in admixture with a vehicle such as carbon tetrachloride is sprayed into the top of the bin or elevator where the grain is stored. Since the vapor is heavier than air it flows downward into the mass of grain, replacing the air with fumigant vapor. In the case where grain is added to the bin from time to time, it is advantageous to treat the partially filled bins after each addition.

The amount of halogen-substituted thiophene employed will usually range upwardly from about 1 part by volume per 400,000 parts of air space. In the use of halogen-substituted thiophenes in soil fumigation, the thiophene derivative may advantageously be incorporated in the soil by injection beneath the surface of the soil and then the surface may be moistened with water to aid in retaining the fumes. The amount employed will vary according to the pests to be killed, the type of soil, the climatic conditions, and the like.

The fumigation of the storage bins, warehouses and buildings wherein material such as grain or soil is held or handled is carried out in much the same way as the fumigation of the material itself.

The compositions of my invention are also effective insecticides where the killing of the insects does not depend upon fumigation. For example, as shown in Example 9 below, my compositions may act as stomach poisons.

The following examples are illustrative of my invention:

Example 1

Bean weevils were subjected to the fumes obtained with 1 part by volume of 2-chlorothiophene per 7570 parts of air space. Within four hours a 100% kill was observed.

Example 2

Same conditions as Example 1, except the concentration of 2-chlorothiophene was lowered to that obtained from 1 part by volume per 151,400 parts of air space. Within 24 hours a 100% kill was observed.

Example 3

Same conditions and concentration as Example 2. A mixture of bean weevils and confused flour beetles were exposed to the fumes. Within 24 hours a 100% kill was obtained.

Example 4

Confused flour beetles were exposed to the fumes obtained with 1 part by volume of 2-chloro thiophene per 189,250 parts of air space. Within 24 hours a 100% kill was obtained.

Example 5

In a series of tests, in each case a mixture of confused flour beetles and carpet beetles were exposed to the fumes of 2-bromothiophene, 2,5-dizromothiophene and 2-iodothiophene. 1 part by volume of each per 94,630 parts of air space was used. In each case, a 100% kill was achieved within 24 hours.

Example 6

Confused flour beetles were exposed to 2,5-dichlorothiophene, in a space concentration of 1 part by volume of the dichlorothiophene per 7570 parts by volume space, for 26 hours, 100% kill was obtained.

Example 7

Both confused flour beetles and bean weevils were exposed to 2,3,5-trichlorothiophene, in the same space concentration as in Example 6 above. An 85% kill of the flour beetles was obtained in 26 hours and a 90% kill of the bean weevils in 5 hours.

Example 8

Bean weevils were exposed to tetrachlorothiophene, in the same concentration as in Example 6. A 60% kill was obtained in 5 hours.

Example 9

In order to demonstrate the effectiveness of these compositions, various halogen-substituted thiophenes were prepared as 5% emulsions in 1:1 mixtures of milk and water. 10 cc. of these emulsions were absorbed on pads of cotton 1 square inch in size, to which common house flies (*Musca domestica*) were exposed while contained in wire mesh cages. The results are shown in the following table which gives the percent of flies killed in the specific time.

| Halogen-substituted thiophene | Time (Hours) | | | |
|---|---|---|---|---|
| | ½ | 1½ | 4 | 10 |
| 2-monochlorothiophene | 77 | 83 | 92 | 100 |
| 2-monobromothiophene | 76 | 91 | 92 | 100 |
| 2-monoiodothiophene | 39 | 80 | 89 | 100 |
| 2,5-dibromothiophene | 20 | 49 | 78 | 100 |

Example 10

To show the effectiveness of the compositions of my invention against soil nematodes, 2 cc. of 2-monochlorothiophene were injected into sand contained within a tightly closed trough 4 inches wide and 4 inches deep, at a point 3 inches removed from an inoculum unit of root-knot nematode, enclosed in cheesecloth and buried in the sand. Soil moisture was 5.7% on a dry weight basis, and soil temperature from 72° to 75° F.

After one week the trough was opened, the inoculum unit removed, and tested for kill of the nematodes by using it to infect squash plants. The roots of the squash plants thus treated showed no more than a trace of galling, whereas squash plant roots similarly infected with a similar unit of nematodes not previously subjected to the action of a chlorothiophene were heavily galled due to attack by the active nematodes.

In employing the compounds of my invention as fumigants or for other insecticidal purposes, they may be compounded with carriers, wetting agents, solvents, diluents, and the like, either liquid, solid or vapor, to make solutions, emulsions, impregnated solids, e. g. dusts, or other types of mixtures, depending upon the application desired, and all such added materials are comprehended within the term "vehicle" or "adjuvant" used herein. It will be seen that the materials mentioned as vehicles or adjuvants all have the property of facilitating distribution of the pest control agent within the infested area, or otherwise contributing to the usefulness of the agent for pest control.

Since many modifications are possible in the process and product of my invention as above described without departing from the scope of the invention, it is intended that the above description of my invention should be interpreted as illustrative, and the invention is not to be limited except as set forth in the claims which follow.

I claim:

1. A pesticidal composition comprising the compound

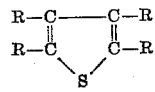

in which "R" is selected from the group consisting of hydrogen and halogen and combinations thereof, at least one "R" being halogen, admixed with a pesticidal adjuvant as a carrier therefor.

2. The composition of claim 1 in which the halogen is chlorine and the adjuvant is selected from the group consisting of a carrier dust, a wetting agent, and a solvent for said compound more volatile than said compound.

3. A pesticidal composition comprising the compound

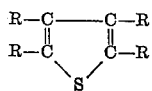

in which "R" is selected from the group consisting of hydrogen and halogen and combinations thereof, at least one "R" being halogen, admixed with a vehicle therefor including a wetting agent.

4. The composition of claim 3 in which the halogen is chlorine.

5. An agricultural pesticidal composition comprising the compound

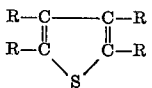

in which each "R" is selected from the group consisting of hydrogen and halogen, at least one "R" being halogen, and a carrier dust therefor.

6. An agricultural pesticidal composition comprising 2-monochlorothiophene and a carrier dust therefor.

7. A fumigant composition for control of insects, worms and related pests comprising dichlorothiophene admixed with a vehicle more volatile than the chlorothiophene and selected from the class consisting of carbon tetrachloride, carbon disulfide, dichloroethane, dichloroethylether and thiophene, the composition being substantially free of ingredients less volatile than the chlorothiophene.

8. A fumigant composition for control of insects, worms and related pests comprising trichlorothiophene admixed with a vehicle more volatile than the chlorothiophene and selected from the class consisting of carbon tetrachloride, carbon disulfide, dichloroethane, dichloroethylether and thiophene, the composition being substantially free of ingredients less volatile than the chlorothiophene.

9. A fumigant composition for control of insects, worms and related pests comprising tetrachlorothiophene admixed with a vehicle more volatile than the tetrachlorothiophene and selected from the class consisting of carbon tetrachloride, carbon disulfide, dichloroethane, dichloroethylether and thiophene, the composition being substantially free of ingredients less volatile than the chlorothiophene.

10. A fumigant composition for control of insects, worms, and related pests comprising 2-monochlorothiophene admixed with a vehicle comprising carbon tetrachloride.

11. In a process for controlling pests the step that comprises treating a locality subject to pests with the compound

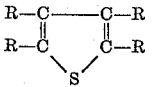

in which each "R" is selected from the group consisting of hydrogen and halogen, at least one "R" being halogen.

12. The process of claim 11 in which the locality treated is insect-infested grain.

13. The process of claim 11 in which the compound is a dichlorothiophene.

14. The process of claim 11 in which the compound is a trichlorothiophene.

15. The process of claim 11 in which the compound is tetrachlorothiophene.

16. In a process for controlling insects, worms, and related pests, the step that comprises treating the infested locality with 2-monochlorothiophene.

17. In a process of fumigating insect-infested grain, the step that comprises treating the infested grain with 2-monochlorothiophene.

RALPH E. PLUMP.

References Cited in the file of this patent

UNITED STATES PATENTS

| Number | Name | Date |
|---|---|---|
| 1,887,156 | Hessle | Nov. 8, 1932 |
| 1,934,803 | Kharasch | Nov. 14, 1933 |

FOREIGN PATENTS

| Number | Country | Date |
|---|---|---|
| 812,749 | France | May 15, 1937 |

OTHER REFERENCES

Tohl: Berichte d. Deutschen Chem. Ges., volume 26, October–December 1893, pages 2947, 2948.

Weitz: Ibid., volume 17, January–June 1884, pages 794, 795.

Alles: "Comparative Physiological Actions of Phenyl-, Thienyl- and Furylisopropylamines," J. Pharm. & Exp. Ther., volume 72, pages 265 to 275 (1941).

Moore: Jr. of Agricultural Research, volume 10, 1917, pages 365 to 371.

Richardson: U. S. D. A. Bulletin Number 1160, May 29, 1923, page 12.